(12) United States Patent
Okamoto

(10) Patent No.: US 7,217,168 B2
(45) Date of Patent: May 15, 2007

(54) ENGINE EXHAUST SYSTEM

(75) Inventor: Haruo Okamoto, Shizuoka-ken (JP)

(73) Assignee: Yamaha Marine Kabushiki Kaisha (JP)

( * ) Notice: Subject to any disclaimer, the term of this patent is extended or adjusted under 35 U.S.C. 154(b) by 0 days.

(21) Appl. No.: 11/233,862

(22) Filed: Sep. 23, 2005

(65) Prior Publication Data
US 2006/0068658 A1 Mar. 30, 2006

(30) Foreign Application Priority Data
Sep. 24, 2004 (JP) ............................. 2004-276968

(51) Int. Cl.
B63H 21/32 (2006.01)
B63H 21/14 (2006.01)

(52) U.S. Cl. .................. 440/89 C; 440/88 C
(58) Field of Classification Search .............. 440/89 R, 440/89 A, 89 B, 89 C, 89 E, 89 F, 89 H, 440/89 J
See application file for complete search history.

(56) References Cited
U.S. PATENT DOCUMENTS 2,882,993 A * 4/1959 Murty ................. 181/281
5,531,620 A 7/1996 Ozawa et al.
6,564,901 B2 * 5/2003 Woods ................. 181/235
6,688,929 B2 * 2/2004 Lecours et al. .......... 440/89 R

FOREIGN PATENT DOCUMENTS
JP HEI 7-156883 6/1995

* cited by examiner

Primary Examiner—Jesús D. Sotelo
(74) Attorney, Agent, or Firm—Knobbe, Martens, Olson & Bear, LLP

(57) ABSTRACT

An engine exhaust system has an exhaust gas passage and a coolant passage. The coolant passage surrounds at least a portion of the exhaust passage. The system is also equipped with an exhaust conduit, which mixes exhaust gases and coolant and then releases the mixture outside of a watercraft. A perforated plate has an array of holes. A central portion of the perforated plate is curved and projects downstream within the exhaust conduit. This curved central portion enables the exhaust gas and the coolant to mix after passing through the perforated plate. A guide tube is positioned downstream of the perforated plate, so that the exhaust gases pass through the guide tube after passing through the holes of the perforated plate. The coolant passes through outer holes of the perforated plate and then passes around the circumference of the guide tube and is ultimately mixed with the exhaust gases.

19 Claims, 6 Drawing Sheets

ENGINE EXHAUST SYSTEM

PRIORITY INFORMATION

The present application is based on and claims priority under 35 U.S.C. § 119(a–d) to Japanese Patent Application No. 2004-276968, filed on Sep. 24, 2004, the entire contents of which is expressly incorporated by reference herein.

BACKGROUND OF THE INVENTION

1. Field of the Invention

The present invention generally relates to exhaust systems and more particularly relates to exhaust systems that are used with engines.

2. Description of the Related Art

Water vehicles often have an exhaust system that includes an exhaust gas passage for the gas discharged from an engine and a coolant passage for coolant that has been used to cool the engine. The exhaust gas passage and the coolant passage mix the exhaust gas and the coolant and then discharge the mixture outside of the vehicle.

Japanese Patent Publication No. Hei 7-156883 discloses water jet propelled boats equipped with this type of engine exhaust system. The exhaust system has an upstream section (on the engine side) that includes an inner pipe and an outer pipe. The inner pipe is positioned within the outer pipe. Exhaust gases pass inside the inner pipe, while coolant passes in a space defined between the inner pipe and the outer pipe. The length of the inner pipe is less than the length of the outer pipe. In a downstream section of the exhaust system, the exhaust gases and the coolant mix with each other and the mixture flows downstream and is ultimately discharged out of the water jet propelled boat. The inner pipe has a restriction having a reduced diameter. The restriction is formed at a downstream end of the inner pipe.

In the exhaust system, pulsations may occur when negative pressure waves propagate inside of the engine during its exhaust stroke. The restriction can suppress the reflection of such negative pressure pulses. Even if the pressure downstream of the restricted portion in the exhaust system becomes higher than that of the pressure upstream of the restriction, the restriction can suppress propagation of such negative pressure waves. The restriction can thus inhibit coolant from flowing upstream to the engine. Hence, the exhaust system can prevent water damage to the spark plugs and other parts of the engine, as well as ignition failure.

Unfortunately, the restriction described in the Japanese document may not sufficiently suppress the propagation of negative pressure waves. As such, negative pressure waves may often adversely affect engine performance and assist the movement of water upstream through the inner pipe and eventually to the engine.

SUMMARY OF THE INVENTION

Accordingly, one aspect of the present invention involves an engine exhaust system that comprises an exhaust conduit having an exhaust gas passage for exhaust gas discharged from an engine and a coolant passage for a coolant that has cooled the engine. The coolant passage surrounds a portion of the exhaust gas passage. The exhaust gas passage extends downstream of an outlet of the coolant passage. A perforated plate has an array of holes and is positioned within the exhaust gas passage at a location generally corresponding to the outlet of the coolant passage.

Another aspect of the present invention involves an exhaust system for a watercraft having an engine. The exhaust system comprises an exhaust conduit having an exhaust gas passage through which exhaust gases discharged from the engine pass and a cooling water passage through which cooling water that has cooled the engine passes. A junction merges the exhaust gases and the cooling water. A perforated plate is positioned between the junction and the exhaust gas passage such that exhaust gases pass through the perforated plate before being mixed with the cooling water at the junction.

A further aspect of the present invention involves an exhaust system for a marine engine. The exhaust system comprises an exhaust conduit. The exhaust conduit has a first end and a second end. The first end of the exhaust conduit comprises multiple runners that are adapted to be connected to a cylinder head of the marine engine. The second end of the exhaust conduit comprises an outlet that is adapted to be secured to a water lock by a connection conduit. The exhaust conduit comprises an outer member and an inner member. An inner surface of the inner member defines an exhaust passage. A coolant passage is defined between an outer surface of the inner member and an inner surface of the outer member. A perforated plate is positioned over at least a portion of the exhaust passage proximate the outlet of the exhaust conduit such that at least a portion of the exhaust gases passing through the exhaust conduit must flow through the perforated plate.

BRIEF DESCRIPTION OF THE DRAWINGS

The above-mentioned and other features of the invention disclosed herein are described below with reference to the drawings of a preferred embodiment. The illustrated embodiment is intended to illustrate, but not to limit the invention. The drawings comprise six figures.

DETAILED DESCRIPTION OF THE PREFERRED EMBODIMENT

Figure 1:
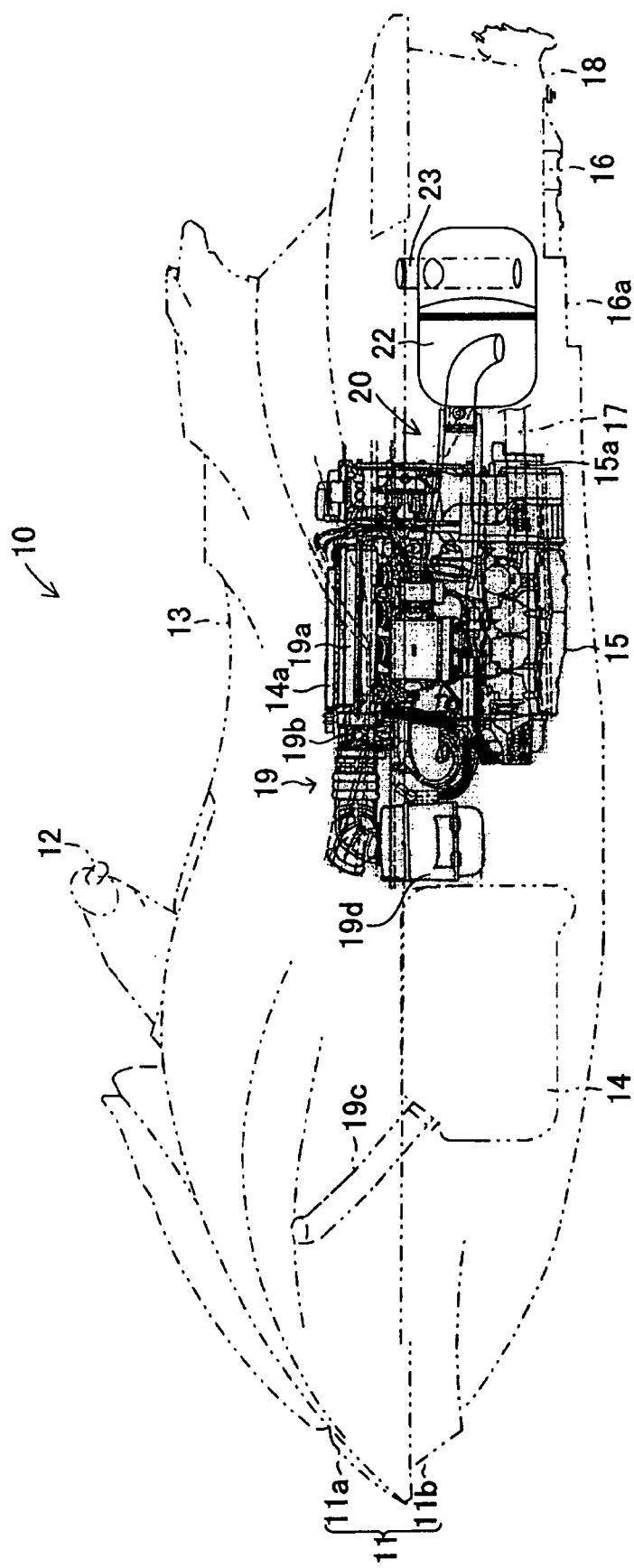
FIG. 1 is a side view of a watercraft having an engine exhaust system connected to an engine and arranged and configured in accordance with certain features, aspects and advantages of the present invention.

With reference to FIG. 1, an overall configuration of a personal watercraft 10, its associated engine 15 and an engine exhaust system is described below. The described engine exhaust system has particular utility with personal watercraft, and thus, it is described in the context of personal watercraft. However, the engine exhaust system can also be applied to other types of vehicles, such as small jet boats and other vehicles that feature marine drives. Some distinct aspects of the present exhaust system also may find utility with other types of vehicles, including automobiles, motorcycles, scooters, and the like, as well as industrial stationary engines, generators, and other engines, for example.

The illustrated watercraft 10 has a body 11 that includes an upper hull section 11a and a lower hull section 11b. The upper and lower hull sections 11a, 11b cooperate to define an internal cavity that can form an engine compartment. The engine compartment can be defined by a forward and rearward bulkhead; however, other configurations are also possible. The engine compartment is preferably located under the seat 13, but other locations are also possible (e.g., beneath the control mast or the bow).

The watercraft 10 also includes handlebars 12 in front of the seat 13 and on top of the upper hull section 11a. The seat 13 is preferably positioned centrally along the upper side of the upper hull section 11a. Additionally, foot mounting steps can be formed at the sides of the body 11. Preferably one foot mounting step is on the left side of the seat 13 and another foot mounting step is on the right side of the seat 13. The illustrated seat 13 has a saddle shape, so that a rider can sit on the seat 13 in a straddle fashion and often is referred to as a straddle-type seat; however, other types of seats can also be employed.

With continued reference to FIG. 1, a fuel tank 14 for storing fuel is disposed in front of the engine 15. Some of the internal components of the watercraft 10 are shown in phantom while others are omitted for clarity. Fuel from the fuel tank 14 can be delivered to the engine 15. The illustrated fuel tank 14 is placed at a forward location in a bottom portion of the body 11.

A jet pump unit 16 is driven by the engine 15 to propel the illustrated watercraft 10. An impeller shaft 17 can extend between the crankshaft 15a of the engine 15 and the jet pump unit 16. A coupling member can be positioned between the impeller shaft 17 and a crankshaft 15a. The crankshaft 15a imparts rotary motion to the impeller shaft which, in turn, drives the pump unit 16.

The jet pump unit 16 is disposed within a tunnel formed on the underside of the lower hull section 11b. The jet pump unit 16 preferably comprises a discharge nozzle and a steering nozzle to provide steering action. The steering nozzle is pivotally mounted about a generally vertical steering axis. The jet pump unit 16 can be connected to the handlebars 12 by a cable or other suitable arrangement so that a rider can pivot the steering nozzle for steering the watercraft 10. Water introduced through the inlet of the jet pump unit 16 is discharged out from the water jet nozzle by the rotation of the impeller to propel the watercraft 10. Other types of marine drives can also be used to propel the watercraft 10 depending upon the application.

An air intake system 19 and exhaust system 20 are connected to the engine 15. The air intake system 19 delivers air to the engine 15 while the fuel is delivered to the engine 15. The exhaust system 20 is configured to route exhaust gases discharged from the engine 15 to a location outside of the watercraft 10. The illustrated exhaust system 20 is configured to discharged exhaust gases out of the rear end of the watercraft 10, preferably through the jet pump.

In some embodiments, the jet pump can be used as a cooling water pump. For example, a cooling water passage can extend between the engine, and/or any other component that is to be cooled, and the jet pump. Thus, water that is pressurized by the jet pump can be guided to the engine body and/or other components of the watercraft 10.

Figure 2:
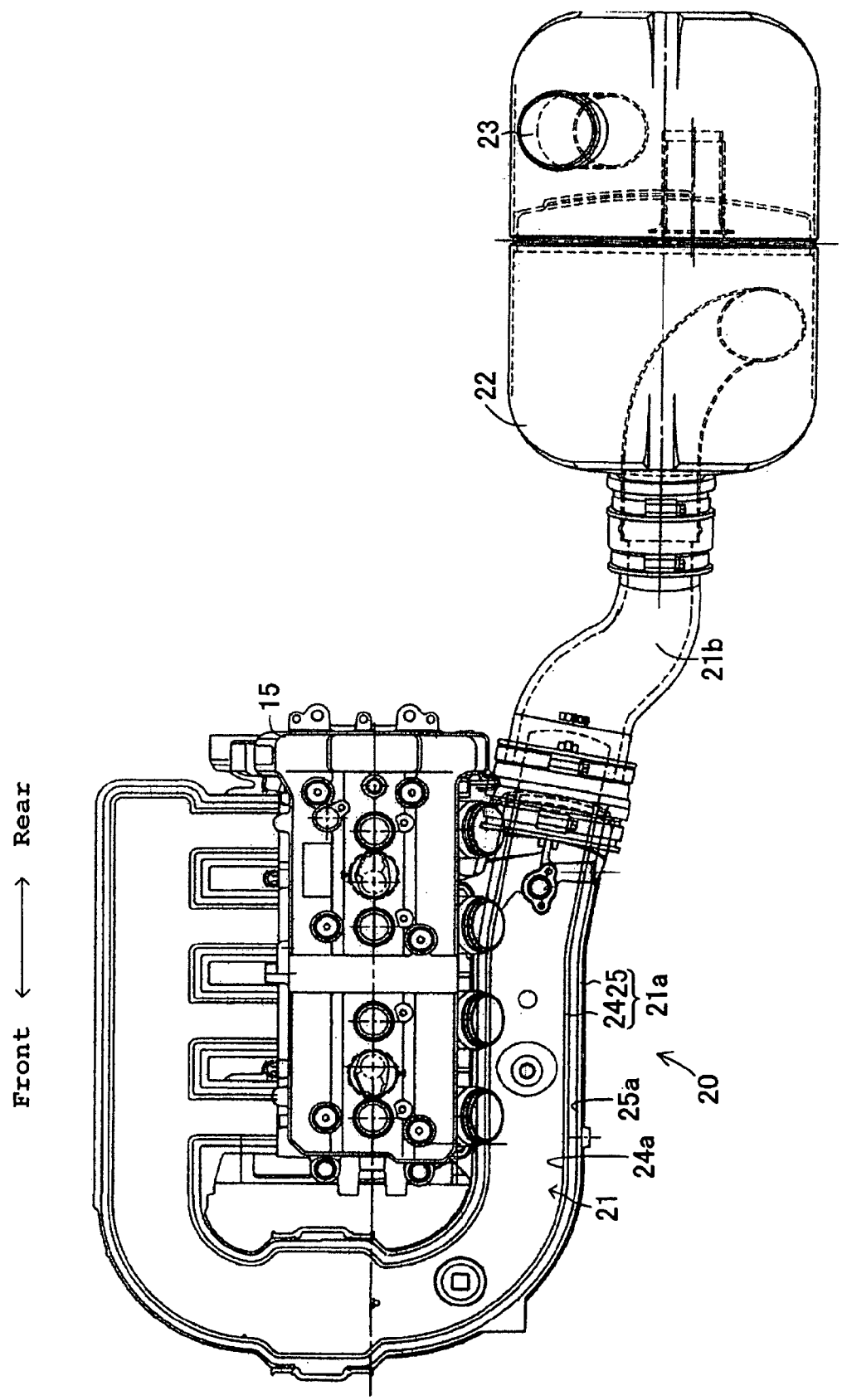
FIG. 2 is a top plan view of the engine and the engine exhaust system of the watercraft of FIG. 1.

With reference to FIGS. 1 and 2, the engine 15 is preferably a four cycle stroke, four cylinder engine. The engine 15 introduces a mixture of fuel and air to the combustion chamber and discharges exhaust gases through exhaust ports. The mixture supplied to the engine 15 is combusted by an ignition of an ignition system (not shown) which is provided in the engine 15. The flow of the air-fuel mixture is controlled by the intake valves and is ignited by an ignition device of the engine 15. As such, the ignition device causes explosions that cause reciprocation of the pistons in the engine 15. The reciprocal movement of the pistons drives the crankshaft 15a. The crankshaft 15a is coupled with an impeller shaft to transmit its rotational power to the impeller shaft 17 to rotate it.

The illustrated engine merely exemplifies one type of engine which can have one or more embodiments of the present exhaust system. Engines having a different number of cylinders, other cylinder arrangements, various cylinder orientations (e.g., upright cylinder banks, V-type, and W-type), and operating on various combustion principles (e.g., four stroke, crankcase compression two-stroke, diesel, and rotary) are all practicable for use with the exhaust system disclosed herein.

The air intake system 19 has an intake conduit 19a connected to the engine 15. A throttle body 19b is connected to an upstream end of the intake conduit 19a. The illustrated throttle body 19b is interposed between the upstream end of the intake conduit 19a and the engine 15.

Outside ambient air is drawn in an air intake box 19d and then the air intake duct 19c. The airflow through air intake duct 19c is adjusted by a throttle valve in the throttle body 19b. In this manner air is supplied to the engine 15. Thus, air and fuel from the fuel supply system 14a are mixed and supplied to the engine 15.

With reference to FIG. 2, the engine exhaust system 20 includes an exhaust conduit 21 that extends rearwardly from the engine 15. The illustrated exhaust conduit 21 is connected to the engine 15 and a water-lock 22 is connected to the rear end of the exhaust conduit 21. An exhaust discharge pipe 23 is connected to the rear portion of the water-lock 22.

The exhaust conduit 21 branches and extends from the exhaust valve of each cylinder in the engine 15. The branching portions of the exhaust conduit 21 merge together on the right side of the engine 15. The exhaust conduit 21 extends forwardly and then in front of the engine 15. The exhaust conduit 21 then extends rearwardly along the left side of the engine 15 in the illustrated embodiment. In the illustrated embodiment of FIG. 2, the exhaust conduit 21 surrounds the front of the engine 15.

The rearward end of the exhaust conduit 21 is in communication with the front of the water lock 22. The exhaust discharge pipe 23 extends rearward from the rear top of the water lock 22, as shown in FIG. 1. The illustrated exhaust discharge pipe 23 extends upwardly from the rear top of the water lock 22. The exhaust discharge pipe 23 then extends downwardly and rearwardly so that its downstream end is exposed at the rear end of the body 11.

The exhaust conduit 21 has an upstream conduit 21a extending along the left side of the engine 15. A connection conduit 21b provides communication between the upstream conduit 21a and the water-lock 22. As such, the upstream conduit 21a and the connection conduit 21b cooperate to provide fluid communication between the engine 15 and the water-lock 22.

Figure 3:
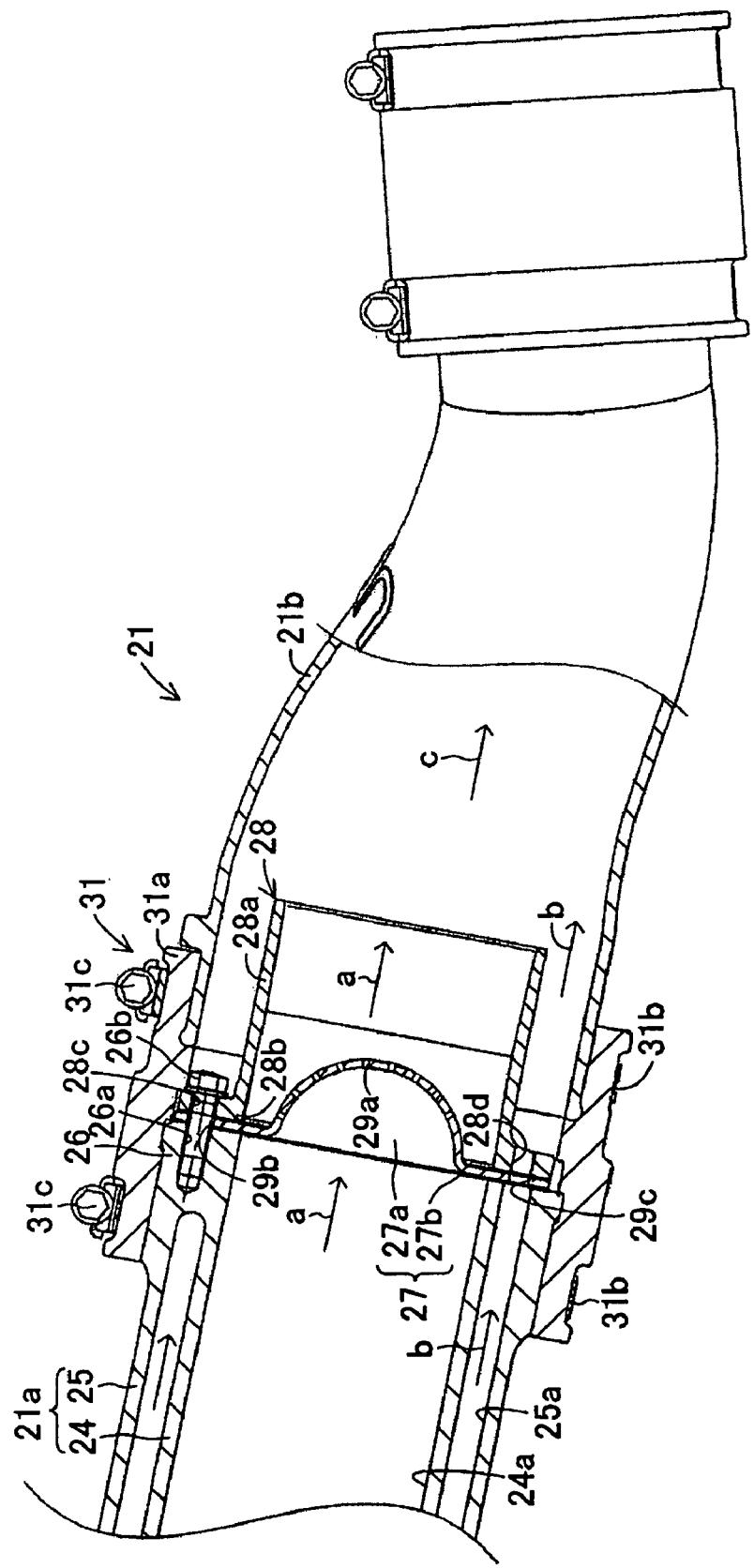
FIG. 3 is a longitudinal sectional view of a portion of an exhaust conduit of the engine exhaust system of FIG. 1.

With reference to FIG. 3, at least a portion of the exhaust conduit 21 can have a plurality of passageways. The illustrated upstream conduit 21a has an inner conduit 24 and an outer conduit 25 that are somewhat concentric. The inner surface of the inner conduit 24 defines an exhaust gas passage 24a. Exhaust gases discharged from the engine 15 can flow through the exhaust gas passage 24a towards the aft end of the watercraft 10 as indicated by the arrows "a."

A cooling water passage 25a is defined by an inner surface of the outer conduit 25 and the outer surface of the inner conduit 24. That is, the gap between the outer surface of the inner conduit 24 and the inner surface of the outer conduit 25 defines a coolant passage 25a for coolant flow. Cooling water from the engine 15 can flow through the cooling water passage 25a. The passage 25a surrounds the exhaust gas passage 24a. A cooling water passage outlet 102 of the passage 25a is configured to mix cooling water with exhaust gases flowing through the exhaust gas passage 24a. In the illustrated embodiment, exhaust gases passing through the exhaust gas passage 24a and the cooling water passing through the cooling water passage 25a are mixed with each other at a junction 104 (see FIG. 3).

The main constituent of the coolant that passes through the coolant passage 25a can be water that surrounds the watercraft 10. If the watercraft 10 is in seawater, the seawater can be drawn from the rear bottom of the boat body 11. In some embodiments, the coolant then passes through cooling passages in the boat body 11 to cool the engine 15 and then passes through the coolant passage 25a. The heated coolant is eventually discharged from the watercraft 10. Other coolants can also be utilized.

With continued reference to FIG. 3, one or more coupling portions can be formed by the inner conduit 24 and the outer conduit 25 at the downstream end of the upstream conduit 21a. Preferably three coupling portions 26 (only one is shown in the FIG. 3) are formed between the inner conduit 24 and the outer conduit 25 at the downstream end of the upstream conduit 21a. The illustrated coupling portions 26 are threaded portions that can be formed circumferentially at regular or irregular intervals. Any suitable number of threaded portions 26 can be positioned based on the intended application.

A flow guide 110 is positioned at some point along the exhaust conduit 21. The illustrated flow guide 110 is attached to the upstream conduit 21a and can inhibit upstream flow of fluid (e.g., coolant) upstream along the upstream conduit 21a. The mixture of coolant and exhaust gases at the junction 104 can be directed towards the water lock 22.

The flow guide 110 advantageously includes a perforated plate 27 and a guide tube 28. The perforated plate 27 and the guide tube 28 can be mounted to the downstream end of the upstream conduit 21a with coupling assemblies 26b (e.g., one or more bolts). The perforated plate 27 can be interposed between the guide tube 28 and the threaded portions 26.

The perforated plate 27 comprises a plurality of holes permitting fluid flow therethrough. When exhaust gases are expelled from the engine 15, the exhaust gases can flow through the exhaust passage 24a and the perforated plated 27 in the direction indicated by the arrows a. The perforated plate 27 can intersect with the exhaust gas passage 24a, preferably intersecting at some point between the engine 15 and the junction 104. In some embodiments, the perforated plate 27 is positioned between the end of the upstream conduit 21a and the junction 104.

Figure 4:
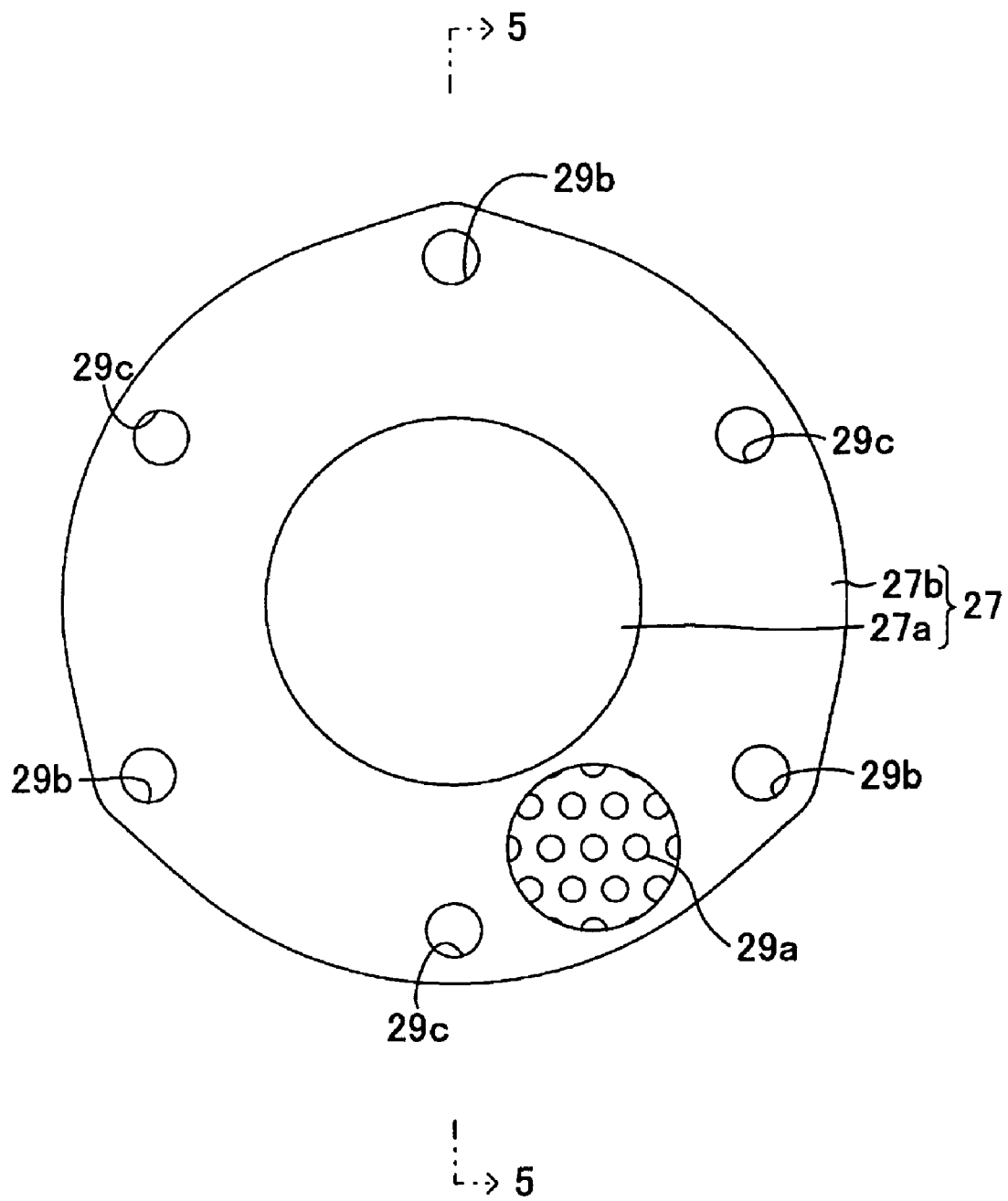
FIG. 4 is a front view of a perforated plate of the engine exhaust system of FIG. 1.
Figure 5:
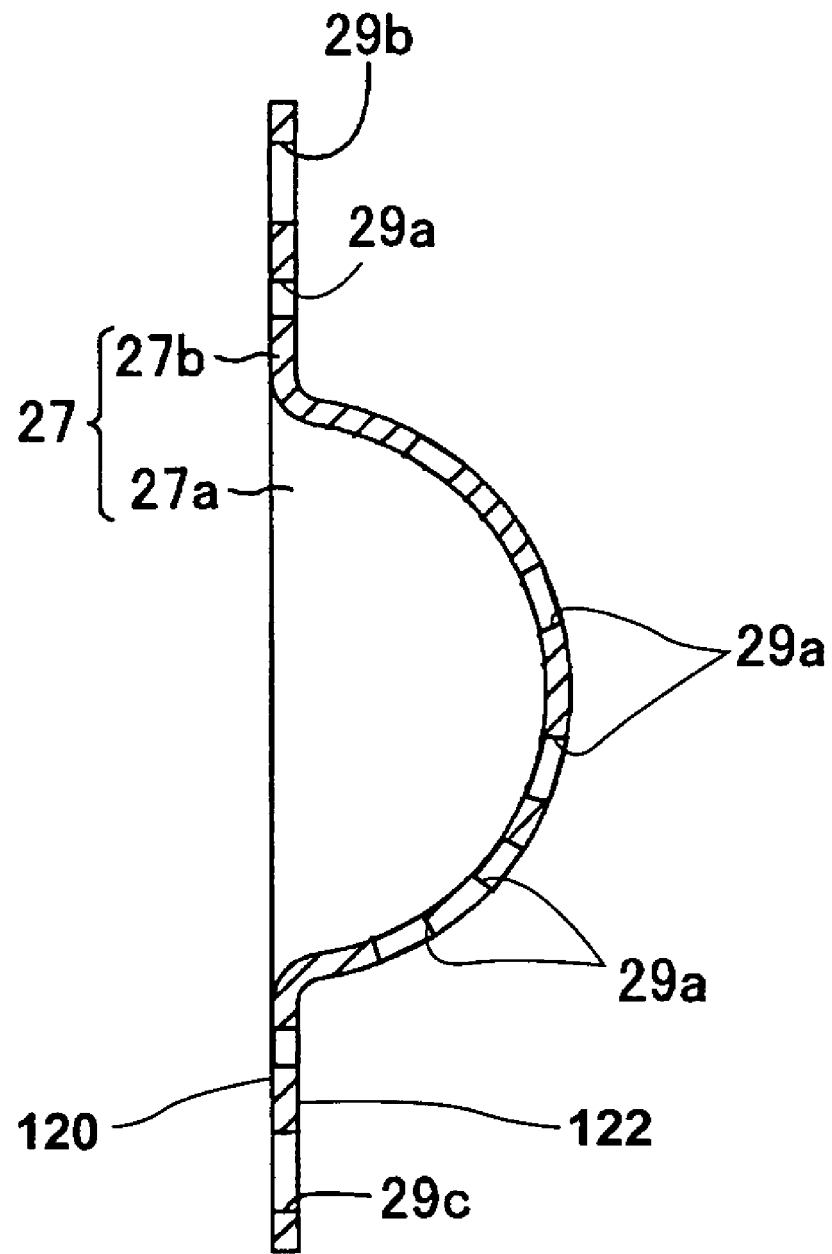
FIG. 5 is a sectional view of the perforated plate taken along the line 5—5 of FIG. 4.
Figure 6:
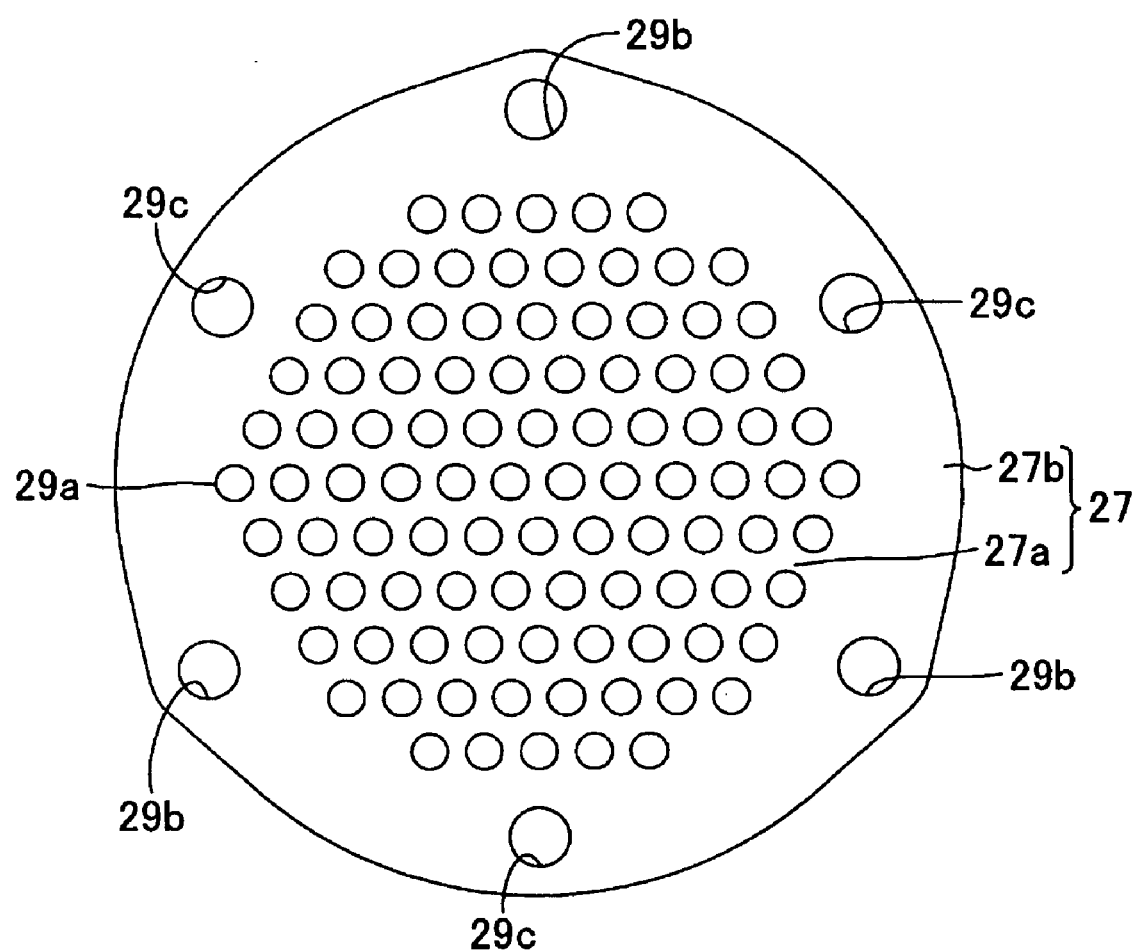
FIG. 6 is a front view of a perforated plate having an array of through holes for exhaust gas passage therethrough.

With reference to FIGS. 4 and 5, the perforated plate 27 includes an inner portion 27a and an outer portion 27b. The inner portion 27a is a centrally disposed portion that is surrounded by the outer portion 27b. In some embodiments, the inner portion 27a has a generally hemispherical shape. As shown in FIGS. 3 and 5, the inner portion 27a protrudes in the downstream direction.

The outer portion 27b is in the form of a flange extending outwardly from the periphery of the inner portion 27a. The inner portion 27a and the outer portion 27b can have a one-piece or multi-piece construction. Non-limiting exemplary perforated plates can have an inner portion that is integrally formed with the outer portion. Alternatively, the perforated plate can comprise an inner portion 27a that is coupled to the outer portion 27b by, for example, welding, fusing, bonding, mechanical fasteners, or other suitable coupling means. A skilled artisan can select the size of the perforated plate 27 such that the plate 27 extends across the exhaust gas passage 24a as desired.

A plurality of holes 29a can be spaced along the plate 27. The plurality of holes 29a can be through-holes having various sizes and configurations. As shown in FIG. 4, the holes 29a in the illustrated embodiment each have a generally circular shape and are evenly spaced from each other. In alternative embodiments, the holes can have other shapes and may be unevenly spaced about the perforated plate 27. The position, configuration, and size of the holes can be selected to achieve the desired flow properties through the exhaust system 21. Various arrays of through-holes can be employed.

The perforated plate 27 can also include one or more mounting holes 29b for mounting the perforated plate 27 to the conduit 21a. Three insertion holes 29b can be positioned at regular intervals along the periphery of the outer portion 27b. Each insertion hole 29b can be configured to receive a fastener (e.g., a bolt 26b of FIG. 3) to couple the perforated plate 27 to the upstream conduit 21a.

The arrangement of the insertion holes 29b is preferably similar or identical to the arrangement of three threaded bores 26a formed at the downstream end of the upstream conduit 21a. When the perforated plate 27 abuts the downstream end of the upstream conduit 21a, the insertion holes 29b can be aligned with the threaded bores 26a. A fastener can be disposed through each mated threaded bore 26a and insertion hole 29b.

One or more holes 29c can be positioned about the perforated plate 27. The holes 29c are preferably somewhat larger than the holes 29a disposed between the insertion holes 29b. That is, the cross-sectional areas of the holes 29c can be substantially greater than the cross-sectional areas of the holes 29a. As shown in FIG. 3, the holes 29c can be positioned so that they are aligned with the openings at the downstream end of the coolant passage 25a. Coolant flowing through the coolant passage 25a can flow through the holes 29c and corresponding holes 28d of the guide tube 28. Thus, a coolant flow path is defined through the perforated plate 27 and the guide tube 28 in the direction indicated by the arrows "b."

The perforated plate 27 can be formed from a somewhat flat stainless steel plate. The steel plate 27 can be formed into the illustrated shape. Metals, plastics, polymers, and other materials suitable for high temperature applications can also be employed. In some non-limiting exemplary embodiments, the plate can have a thickness in the range of about 2 mm to 4 mm. The plate 27 can have other thicknesses to achieve the desired structural properties, flow properties, and the like. A pressing process can be employed to shape the plate 27.

The perforated plate 27 can also be made by a punching process in the embodiment described above. However, a wire mesh (e.g., a stainless steel mesh) may be alternatively used. This eases the forming process and reduces fabrication costs. The surface of the plate 29 may comprise a catalyst. A catalyst may be provided at a given point downstream or upstream of the perforated plate 27 inside the exhaust gas passage 24a, instead of the surface of on the perforated plate 27.

The total area of all the small holes 29a (i.e., the holes for exhaust gas flow) is preferably about 50% of the entire surface area of at least one of the front and back faces 120, 122 of the perforated plate 27. In some non-limiting exemplary embodiments, the total area of all the small holes 29a is preferably about 25% to 70% of the entire surface area of at least one of the front and back faces 120, 122. The entire surface of the perforated plate 27 may be coated for carrying a catalyst.

If the shape of the curved central portion 27a of the plate 27 intersecting with the exhaust gas passage 24a is somewhat hemispherical, the surface area of the curved portion 27a can be generally doubled in comparison to a similarly positioned flat plate. If the curved portion 27a is hemispherical and the total area of holes 29a is about 50% of the surface area of the hemispherical portion 27a, then the total area of holes 29a is generally equal to the opening area of the exhaust gas passage 24a. Therefore, the exhaust gases flow downstream under the same conditions as when the plate 27 is not provided, but the plate 27 also inhibits backflow of the coolant. The curved portion 27a may protrude either upstream or downstream. In some embodiments, the percentage of the total area of the holes 29a to the whole area (including the total area of the holes) of the portion of the plate 27 that intersects with the exhaust gas passage is about 40% to about 70%.

In some embodiments, the entire perforated plate 27 is flat wherein the area of the holes 29a can be relatively large. In alternative embodiments, the central portion 27a of the plate 27 is somewhat curved and, thus, has a relatively large area. In some embodiments, the central portion 27a of the plate 27 is generally hemispherical. The ratio of the total area of the holes to the total area of the plate 27 (including the area of the holes) that intersects with the passage 24a can be about 0.5. If the area of the curved portion 27a is increased, then the ratio of the total area of the holes to the area of the plate 27 can be reduced to about 0.40. If the area of the curved portion 27a is decreased, then the ratio can be correspondingly increased to about 0.70. The ratios can be decreased or increased based on whether the curvature of the curved portion 27a is increased or decreased.

When the exhaust gases and coolant flow through the exhaust passage 24a and the coolant passage 25a, the exhaust gases pass through the holes 29a and the coolant passes through the holes 29c, which are positioned in the outer circumference of the plate 27. The exhaust gases and the coolant then mix downstream of the perforated plate 27 at the junction 104. If the mixture (i.e., the mixture of exhaust gases and coolant) flows upstream towards the engine 15, the perforated plate 27 can inhibit the mixture from flowing further upstream. Additionally, when the exhaust gases pass through the holes of the perforated plate 27a, the other portions of the plate 27 stop the flow of a portion of the exhaust gases, resulting in noise reduction.

In some cases, negative pressure waves occur when the downstream pressure becomes greater than the pressure upstream of the perforated plate 27. However, the backflow of the coolant can be effectively reduced or prevented because of perforated plate 27. Even if the size of the negative pressure waves generated in an exhaust stroke changes (e.g., the size changes due to a modification of engine), the reduction or prevention of backflow can still be maintained. This backflow reduction or prevention can be applied to various types of engine.

With reference again to FIG. 3, the guide tube 28 comprises a generally circular tube 28a and a corresponding flange 28b. The flange 28b preferably extends outwardly from an upstream end of the circular tube 28a. One or more insertion holes 28c can be aligned with the holes 29b when the guide tube 28 abuts the back face 122 of the perforated plate 27. In some embodiments, three insertion holes 28c can be positioned at regular or irregular intervals along the flange 28b. The arrangement of the insertion holes 28c is preferably similar or identical to the arrangement of the threaded bores 26a and insertion holes 29b. The insertion holes 28c, threaded bores 26a, and insertion holes 29b can be generally coaxial.

The through holes 28d are spaced from the insertion holes 28c. The through holes 28d can be positioned at irregular or regular intervals along the flange. Coolant can flow through the through holes 28d.

When the perforated plate 27 mates with the end of the upstream conduit 21a and the curved portion 27a extends downstream, the guide tube 28 is disposed downstream of the perforated plate 27. The curved portion 27a extends at least partially through the central portion of the guide tube 28. The flange 28b of the guide tube 28 is preferably aligned with the flange 27b of the perforated plate 27. The perforated plate 27 and guide tube 28 can be coupled to the downstream end of the upstream conduit 21a by inserting the bolts 26b in the corresponding insertion holes 28c and 29b. The bolts 26b are then rotated into the threaded bores 26a. This design makes the installation of the perforated plate 27 easy and robust. The perforated plate 27 is preferably disposed so that at least a portion of the outer circumferential portion of the perforate plate 27 intersects with the coolant passage 25a. As such, the coolant can flow through the holes 29c, 28d.

The coolant continues to flow downstream of the conduits 24, 25 after the coolant has passed the holes 29c. This can effectively inhibit the coolant from flowing back towards the engine 15, as it becomes mist. The design also makes the installation of the perforated plate 27 easy and robust.

The tube 28a of the guide tube 28 is positioned in the connection conduit 21b. The outer surface of the tube 28 can be spaced from the inner surface of the connection conduit 21b to form the cooling water passage outlet 102.

The guide tube 28 can also limit or prevent backflow of coolant due to the negative pressure waves generated in an exhaust stroke. When the coolant, which has flown downstream of the exhaust conduit 24, is discharged from the coolant passage 25a, the coolant is still in the form of large water droplets. As the coolant flows downstream along the circumference of the guide tube 28, these droplets are reduced in size and generally become mist. Even if the mist were to flow upstream towards the engine 15 and enter the guide tube 28, the amount of coolant flowing upstream may be negligible. Additionally, the coolant will rarely reach the engine 15 because it has to pass through the holes 29a in the perforated plate 27.

With reference again to FIG. 3, a coupling assembly 31 can couple the upstream conduit 21a and the connection conduit 21b. The illustrated coupling assembly 31 includes bands 31b that surround a sealing member 31a. Seals, preferably watertight seals, are formed between the member 31a, the upstream conduit 21a and the connection conduit 21b. Any number of bands 31b can be utilized to couple the sealing member 31a to the upstream conduit 21a and the connection conduit 21b. In the illustrated embodiment of FIG. 3, one band 31b surrounds a portion of the sealing member 31a disposed over the upstream conduit 21a while another band 31b surrounds a portion of the sealing member 31a disposed over the connection conduit 21b.

Each of the bands 31b can be coupled to an adjustment assembly 120. The adjustment assemblies 120 can be used to adjust the tensioning of the bands 31b. Each adjustment assembly 120 can have a screw member 31c for selectively tightening and loosening of the associated band 31b. Each adjustment assembly can tighten an associated band 31a along the circumference of the sealing member 31a by rotating each screw member 31c in an appropriate direction. As such, the bands 31b couple the facing portions of the upstream conduit 21a and the connection conduit 21b while inhibiting any fluid flow out of the junction between the conduits. The seal member 31a can provide an air tight seal to inhibit coolant and/or exhaust gases from escaping out of the upstream conduit 21 and the connecting conduit 21b. The sealing member 31a can be constructed of various materials that can form an effective seal. The illustrated sealing member 31a can be formed of a somewhat compliant material, such as a polymer, rubber, and the like. Although not illustrated, one or more sealing members (e.g., O-rings, gaskets, etc.) can be used to form effective seals in combination with the sealing member 31a.

The sealing member 31a can have one or more recesses for positioning the bands 31b. In some embodiments, including the illustrated embodiment of FIG. 3, the band 31a includes a first recess that receives the band 31b disposed about the upstream conduit 21a and a second recess that receives the band 31b disposed about the connecting conduit 21b. The recesses cooperate to inhibit axial movement of the associated band 31b. The illustrated recesses preferably are U-shaped recesses spaced from each other and formed in the outer periphery of the sealing member 31a.

To operate the watercraft 10, an operator can first turn on a switch proximate the steering handlebars 12 to start running the watercraft 10. The operator steers the watercraft 10 by moving the steering handlebars 12 and operates a throttling member on a grip of the steering handlebars 12 to control vehicle speed.

While the watercraft 10 runs, exhaust gases discharged from the engine 15 flow through the upstream conduit 21a toward the perforated plate 27. In the illustrated embodiment of FIG. 3, the exhaust gases pass through the holes 29a in the perforated plate 27, as indicated by the arrow a. After the exhaust gases pass through the plate 27, they can flow through the guide tube 28 to the junction 104.

In some embodiments, the perforated plate 27 is configured to treat the exhaust gases. If a catalyst layer is provided on the surface of the perforated plate 27, then the catalyst layer can clean the exhaust gases. Various types of catalysts can be utilized. The plate 27 can comprise steel that has been coated with platinum. However, other configurations and types of catalyst can be used to remove combustion by-products and/or other substances from the exhaust gases. Of course, the perforated plate 27 may not have any catalyst layer if desired.

A catalyst can also be positioned in the exhaust gas passage 24a upstream or downstream of the perforated plate 27. Preferably, the catalyst is positioned upstream of the plate 27. As such, the cooling water (or exhaust gas and cooling water mixture) may not contact and impair the performance of the catalyst during normal operating conditions. The catalyst can have a honeycomb base structure that is coated with platinum, for example. The exhaust gas passing through the exhaust gas passage 24a is preferably cleaned before the exhaust gas reaches the perforated plate 27.

In addition, the perforated plate 27 can be constructed of stainless steel that is corrosion-resistant to water and exhaust gas. Because exhaust gases can reach high temperatures, the perforated plate 27 can also be formed of a heat-resistant material. The perforated plate can therefore be durable for a prolonged working life.

The exhaust gases, either cleaned or uncleaned, flow from the guide tube 28 into the connection conduit 21b. The coolant flow is indicated by the arrow b. The coolant preferably passes through the coolant passage 25a, the holes 29c in the perforated plate 27, and the through-holes 28d in the guide tube 28. The coolant then proceeds to flow through the passage 102 and eventually into the junction 104. In the junction 104, large water droplets in the coolant generally become mist and spatter into the connection conduit 21b when mixed with the exhaust gases.

The exhaust gas and coolant are finally mixed downstream of the guide tube 28 at the junction 104. The resultant mixture flows downstream of the connection conduit 21b as indicated by the arrow c. The mixture flows downstream into the water-lock 22, preferably without back flow. The guide tube 28 and the perforated plate 27 are disposed between the upstream conduit 21a and the connection conduit 21b in order to inhibit back flow of the exhaust gases and/or coolant. That is, the guide tube 28 and the perforated plate 27 cooperate to inhibit flow of the coolant towards the engine 15. Additionally, the exhaust gas can be restricted or throttled by the perforated plate 27 as the exhaust gases pass the holes 29a, thus reducing exhaust noise.

The exhaust gas and the coolant are released from the water lock 22 via the exhaust conduit 23. The exhaust gas and coolant mixture is then emitted out of the watercraft 10. The exhaust conduit 23 and the water-lock 22 cooperate to prevent water from flowing back into the exhaust conduit 21.

The guide tube 28 is disposed downstream of the perforated plate 27. The coolant from the coolant passage 25a passes through the holes 29c in the perforated plate 27 and the through holes 28d in the guide tube 28, then passes along the outer circumference of the guide tube 28, and eventually enters the connection conduit 21b. The coolant mixes with the exhaust gases in the connection conduit 21b. For coolant to flow back towards the engine 15, the coolant has to pass through the passage 102 and/or through the holes 29a of the perforated plate 27. However, because the water droplets generally become mist while moving inside the connection conduit 21b from the coolant passage 25a, the mist rarely flows upstream towards the engine 15. The downstream flow of exhaust gases and coolant preferably inhibit upstream flow of mist towards the engine 15.

The exhaust system 21 can be assembled by inserting the bolts 26b in the insertion holes 28c of the guide tube 28 and the insertion holes 29b of the perforated plate 27. The periphery 27b of the plate 27 is sandwiched between the guide tube 28 and at least a portion of the upstream conduit 21a.

The bolts 26b are then rotated into the threaded bores 26a of the threaded portions 26. In such embodiments, the flange 28b of the guide tube 28 can be used to secure the perforated plate 27 to the rear end of the upstream conduit 21a. The perforated plate 27 can be mounted to the upstream conduit 21a without any additional mounting devices. Additionally, the perforated plate 27 and the guide tube 28 can be secured to the downstream end of the upstream conduit 21a, which does not have a mounting flange or the like.

Because the holes in communication with the coolant passage are formed in the periphery of the plate 27 and the guide tube 28, the coolant in the coolant passage 25 flows downstream of the upstream conduit 21a after passing the holes 29c, 28d. As such, the flange 28b does not block the coolant passage 25. It is preferable to provide the flange 28b at the downstream end of the coolant passage 25.

In the embodiment described above, the three holes 29c formed in the perforated plate 27 and the three through holes 28d formed in the guide tube 28 are used as the passages for the flow of the coolant from the coolant passage 25a to the connection conduit 21b. The size and number of these holes can be changed, so as to increase the flow rate of the coolant flow per hour. Additionally, the guide tube 28 may not be used in the engine exhaust system.

The engine exhaust system 20 can be applied to not only water jet propelled boats 10 but also other vehicles, if the systems are equipped with the exhaust conduit having the passages for respective exhaust gas and coolant. For the structure and material of other sections that constitute the engine exhaust system, modifications can be made within the technical scope of the present invention, as required.

Additionally, coolant can not only flow outside from the engine, but also water or the like may flow back from outside and enter the exhaust conduit 21. The engine exhaust system of this type can result in a watercraft that is equipped with highly waterproofed engine.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An engine exhaust system comprising an exhaust conduit having an exhaust gas passage for exhaust gas discharged from an engine and a coolant passage for a coolant that has cooled the engine, the coolant passage surrounding a portion of the exhaust gas passage, the exhaust gas passage extending downstream of an outlet of the coolant passage, a perforated plate having an array of holes and being positioned within the exhaust gas passage at a location generally corresponding to the outlet of the coolant passage.

2. The engine exhaust system of claim 1, wherein a mixing region is defined within the exhaust conduit at a location downstream of the perforated plate.

3. The engine exhaust system of claim 1, further comprising a removable exhaust conduit that defines a portion of the exhaust gas passage, the perforated plate being disposed in the exhaust conduit so that an outer circumferential portion of the perforated plate intersects with the coolant passage, and the outer circumferential portion having a plurality of holes positioned such that coolant from the coolant passage flows therethrough.

4. The engine exhaust system of claim 1, wherein a guide tube is disposed downstream of the perforated plate so that the exhaust gas having passed through the holes of the perforated plate flows downstream through the guide tube, the coolant can flow downstream along an outer surface of the guide tube, and the coolant and the exhaust gas mix downstream of the guide tube.

5. The engine exhaust system of claim 4, wherein the guide tube has a flange formed on an outer peripheral portion thereof, the flange having at least one hole in communication with the coolant passage and insertion holes, an outer circumferential portion of the perforated plate has plate insertion holes, the exhaust conduit that defines the exhaust gas passage and coolant passage and has threaded bores, a plurality of bolts extend through the insertion holes of the flange and the plate insertion holes with at least a portion of the perforated plate being sandwiched between the flange and the exhaust conduit such that the bolts secure the guide tube and the perforated plate to the exhaust conduit.

6. The engine exhaust system of claim 1, wherein the perforated plate has a portion that intersects with the exhaust gas passage and having a curved surface which projects outwardly.

7. The engine exhaust system of claim 1, wherein a percentage of the total cross sectional area of the holes of the perforated plate to the entire area, including the total area of the holes, of the portion of the perforated plate intersecting with the exhaust gas passage is about to 40% to 70%.

8. The engine exhaust system of claim 1, wherein the engine exhaust system is installed on a water jet propelled boat.

9. An exhaust system for a watercraft having an engine, the exhaust system comprising an exhaust conduit having an exhaust gas passage through which exhaust gases discharged from the engine pass and a cooling water passage through which cooling water that has cooled the engine passes, a junction is configured to merge the exhaust gases and the cooling water, and a perforated plate being positioned upstream of the junction within the exhaust gas passage such that exhaust gases pass through the perforated plate before being mixed with the cooling water at the junction.

10. The exhaust system of claim 9, further comprising a guide tube extending away from the perforated plate, an outer surface of the guide tube and an inner surface of an exhaust system conduit defining a coolant passage, the guide tube having an inner surface that defines an exhaust passage, and the perforated plate is positioned between the exhaust gas passage of exhaust conduit and the exhaust passage of the guide tube.

11. The exhaust system of claim 10, wherein the perforated plate and the guide tube cooperate so that the exhaust gases which have passed through holes of the perforated plate flow downstream through the exhaust passage of the guide tube and the coolant flows through the coolant passage between the guide tube and the exhaust system conduit, and the exhaust gases and coolant are mixed at the junction.

12. The engine exhaust system of claim 10, wherein the guide tube has an outwardly extending flange, at least a portion of the perforated plate is interposed between the exhaust conduit and the flange, and a plurality of threaded fasteners extends through and couples together the flange, the perforated plate, and the exhaust conduit.

13. The engine exhaust system of claim 12, wherein at least one coolant passage extends through the perforated plate and the flange of the guide tube, and the at least one coolant passage extends between the junction and the cooling water passage.

14. The engine exhaust system of claim 9, wherein the perforated plate has an outer periphery that intersects with the cooling water passage, and the outer periphery having a plurality of coolant holes positioned such that coolant from the cooling water passage passes therethrough.

15. The engine exhaust system of claim 9, wherein the holes of the perforated plate form about 40% to about 70% of the total area of a portion of the perforated plate that intersects with the exhaust passage.

16. An exhaust system for a marine engine, the exhaust system comprising an exhaust conduit, the exhaust conduit having a first end and a second end, the first end of the exhaust conduit comprising multiple runners that are adapted to be connected to a cylinder head of the marine engine, the second end of the exhaust conduit comprising an outlet that is adapted to be secured to a water lock by a connection conduit, the exhaust conduit comprising an outer member and an inner member, an inner surface of the inner member defining an exhaust passage, a coolant passage being defined between an outer surface of the inner member and an inner surface of the outer member, a perforated plate being positioned over at least a portion of the exhaust passage proximate the outlet of the exhaust conduit such that at least a portion of the exhaust gases passing through the exhaust conduit must flow through the perforated plate, and an exhaust guide tube that extends at least partially into the connection conduit with the perforated plate being positioned between the exhaust guide tube and the exhaust conduit.

17. The exhaust system of claim 16, wherein a single set of fasteners secures both the exhaust guide tube and the perforated plate to the exhaust conduit.

18. The exhaust system of claim 16, wherein the perforated plate comprises a bulging portion that extends into the exhaust guide tube.

19. The exhaust system of claim 18, wherein the bulging portion comprises a generally spherical configuration.

* * * * *